(12) United States Patent
Ho (10) Patent No.: US 8,554,467 B2
(45) Date of Patent: Oct. 8, 2013

(54) TRAVEL TIME DETERMINATION

(75) Inventor: William P. C. Ho, Mukilteo, WA (US)

(73) Assignee: DDS Wireless International Inc. (CA)

( * ) Notice: Subject to any disclaimer, the term of this patent is extended or adjusted under 35 U.S.C. 154(b) by 0 days.

(21) Appl. No.: 13/227,348

(22) Filed: Sep. 7, 2011

(65) Prior Publication Data

US 2011/0320118 A1 Dec. 29, 2011

Related U.S. Application Data (62) Division of application No. 11/520,088, filed on Sep. 12, 2006, now Pat. No. 8,036,822.

(51) Int. Cl.
*G01C 21/00* (2006.01)

(52) U.S. Cl.
USPC ........... 701/408; 701/414; 701/430; 701/423; 701/117; 340/995.13; 340/988; 340/994; 340/995.12; 340/995.1; 455/456.1

(58) Field of Classification Search
USPC ........................................................ 701/408
See application file for complete search history.

(56) References Cited

U.S. PATENT DOCUMENTS

| | | | |
|---|---|---|---|
| 5,933,100 A * | 8/1999 | Golding | 340/995.13 |
| 6,567,743 B1 * | 5/2003 | Mueller et al. | 701/533 |
| 6,594,576 B2 * | 7/2003 | Fan et al. | 701/117 |
| 6,862,524 B1 * | 3/2005 | Nagda et al. | 701/420 |
| 2004/0220728 A1 * | 11/2004 | Cayford | 701/209 |
| 2004/0225437 A1 * | 11/2004 | Endo et al. | 701/209 |
| 2005/0043037 A1 * | 2/2005 | Ioppe et al. | 455/456.1 |
| 2008/0065318 A1 * | 3/2008 | Ho | 701/201 |

\* cited by examiner

*Primary Examiner* — Redhwan K Mawari
(74) *Attorney, Agent, or Firm* — Foley & Lardner LLP (57) ABSTRACT

The present invention relates to travel time determination, for example, determining a predicted travel time between locations based on historical data. One aspect of the invention is directed toward a method for determining a predicted amount of time required to travel from one location to another that includes dividing a region into multiple grid portions and designating each grid portion that contains at least one address of interest as a departure grid, a destination grid, or both. The method can further include generating a searchable data arrangement that includes travel times associated with traveling from selected departure grids to selected destination grids, and updating the travel times using historical data.

13 Claims, 9 Drawing Sheets

| $P_1$ | $x_1, y_2$ | $x_1, y_3$ | $x_2, y_2$ | $x_2, y_3$ | $x_3, y_4$ |
|---|---|---|---|---|---|
| $x_1, y_2$ | t | t | t | t | t |
| $x_1, y_3$ | t | t | t | t | t |
| $x_2, y_2$ | t | t | t | t | t |
| $x_2, y_3$ | t | t | t | t | t |
| $x_3, y_4$ | t | t | t | t | t |

FIG. 14

| $P_1$ | $x_1, y_2$ | $x_3, y_4$ |
|---|---|---|
| $x_1, y_2$ | t | t |
| $x_3, y_4$ | t | t |

FIG. 15

TRAVEL TIME DETERMINATION

CROSS-REFERENCE TO RELATED APPLICATIONS

This application is a divisional of U.S. application Ser. No. 11/520,088 filed Sep. 12, 2006, which is herein incorporated by reference in its entirety.

TECHNICAL FIELD

The present invention relates to travel time determination, for example, determining a predicted travel time between locations based at least in part on historical data.

BACKGROUND

Travel time generators are often used to calculate or predict the expected travel time between two locations. Current travel time generators typically use the actual street network represented in a graphic information system database to determine a route between two selected locations. Once the route is selected, the travel time generators determine the type of street and distance associated with each segment of the route. Additionally, the travel time generators assign a speed for the various street types associated with the route segments. The distance associated with each segment and the assigned speeds are then used to compute an expected travel time for each segment and for the overall route.

Although, current travel time generators provide a rough estimate of the expected travel time between two locations, they can be inaccurate. For example, the travel speed of a vehicle traveling in an urban area can vary significantly within each route segment based on the time of day, the direction of travel, and the geographic attributes of the area. Inaccuracy in travel time predictions can be problematic in many ways. For example, if the estimated travel time for a mass transit vehicle is too low, the vehicle can run behind schedule, resulting in driver and rider complaints. If the estimated travel time for a mass transit vehicle is too high, the result can be that the vehicle must slow down or wait at various locations, resulting in system wide inefficiencies.

SUMMARY

Certain aspects of the invention are directed generally toward systems and methods for travel time determinations. For example, certain aspects of the present invention are directed toward a method in a computer system for determining a predicted amount of time required to travel from one location to another that includes maintaining a searchable data arrangement that includes travel times associated with traveling from selected departure grids to selected destination grids. Each selected departure grid and each selected destination grid can be associated with at least one address of interest in a region. The method can further include receiving historical data that includes actual amounts of time that have been required to travel from selected departure grids to selected destination grids, and updating the travel times using the historical data.

Other aspects of the present invention are directed toward a computer-readable medium containing instructions for controlling a computing environment to perform a method that includes maintaining a searchable data arrangement that includes travel times associated with traveling from selected departure grids to selected destination grids. Each selected departure grid and each selected destination grid can be associated with at least one address of interest in a region. The method can further include receiving historical data that includes actual amounts of time that have been required to travel from selected departure grids to selected destination grids, and updating the travel times using the historical data.

Still other aspects of the invention are directed toward a method for determining a predicted amount of time required to travel from one location to another that includes dividing a region into multiple grid portions and designating each grid portion that contains at least one address of interest as a departure grid, a destination grid, or both. The method can further include generating a searchable data arrangement that includes travel times associated with traveling from selected departure grids to selected destination grids, and updating the travel times using historical data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the following description, numerous specific details are provided in order to give a thorough understanding of embodiments of the invention. One skilled in the relevant art will recognize, however, that the invention may be practiced without one or more of the specific details, or with other methods, components, materials, etc. In other instances, well known structures, materials, or operations are not shown or described in order to avoid obscuring aspects of the invention.

References throughout the specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
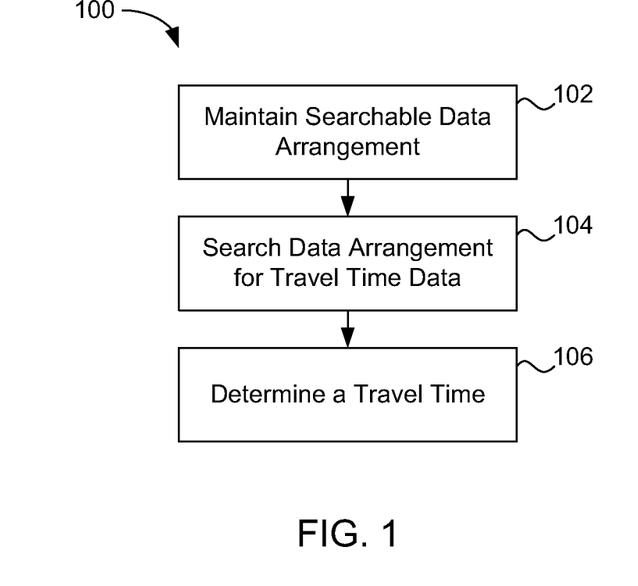
FIG. 1 is a flow diagram that illustrates a process for determining a predicted amount of time required to travel from one location to another in accordance with certain embodiments.

FIGS. 1-15 illustrate various aspects of travel time determination in accordance with certain embodiments, including determining a predicted travel time between locations based at least in part on historical data. For example, FIG. 1 is a flow diagram that illustrates a process 100 for determining a predicted amount of time required to travel from one location to another in accordance with one embodiment. In Block 102, the process includes maintaining a searchable data arrangement. For example, as discussed below in further detail, the searchable data arrangement can be updated with historical data (e.g., actual travel times recorded for trips from the one location to the other). The process can further include searching the data arrangement for an associated travel time (Block 104) and determining a predicted travel time from the one location to the other (Block 106). In certain embodiments, updating the searchable data arrangement with historical data can provide increased accuracy over those available with current systems.

Figure 2:
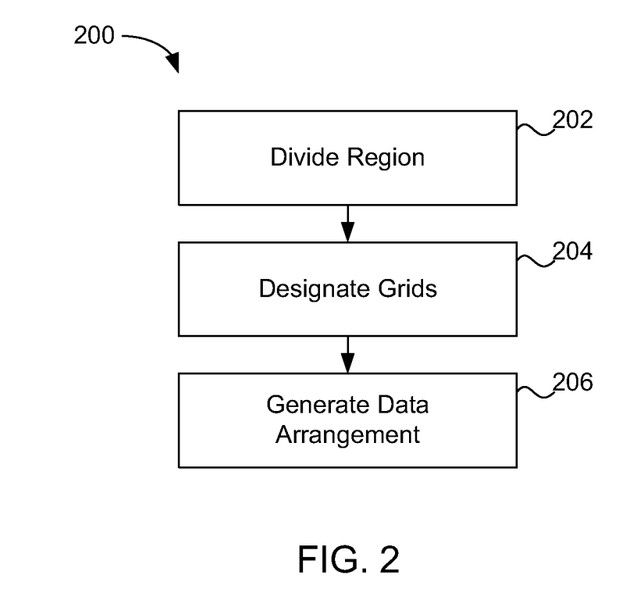
FIG. 2 is a flow diagram that illustrates a process for generating a data arrangement associated with a region in accordance with selected embodiments.

As shown in FIG. 2, a process 200 for forming the searchable data arrangement can include dividing a region into multiple grid portions (Block 202). The process can further include designating each grid portion that contains at least one address of interest as a departure grid, a destination grid, or both (Block 204). The process 200 can still further include generating a searchable data arrangement that includes travel times associated with traveling from selected departure grids to selected destination grids (Block 206).

Figure 3:
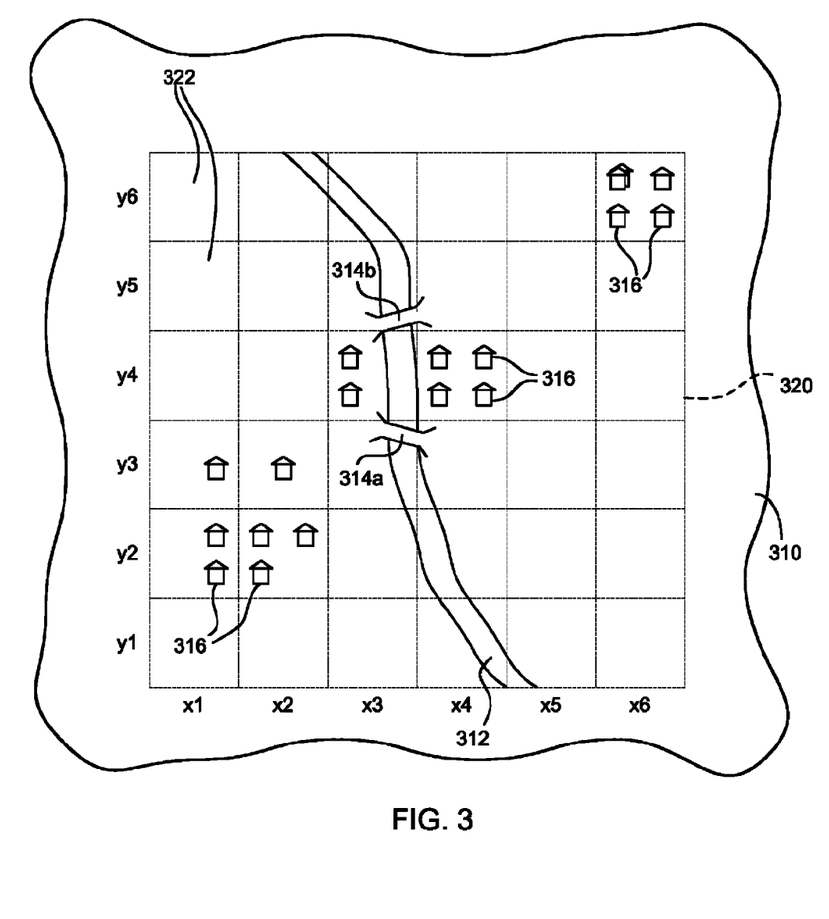
FIG. 3 is a partially schematic illustration of multiple grid portions associated with a region in accordance with certain embodiments.

FIG. 3 is a partially schematic illustration of a portion of a region 310 that has been divided into multiple grid portions 322 in accordance with certain embodiments. The region 310 can include a surface region (e.g., a land or water region) or any other region that can be divided into multiple portions. In the illustrated embodiment, the region 310 includes a portion of land that includes an urban area with buildings and roads. Additionally, a river 312 runs through a portion of the region 310. A first bridge 314a and a second bridge 314b allowed transit across the river 312. The region 310 also includes multiple addresses of interest 316. An address of interest 316 can include any location. For example, an address of interest 316 can be a building address, a bus stop, and intersection of two roads, or any other location that can be identified (e.g., any location in space). For the purpose of illustration, various buildings and roads are not shown in FIG. 3.

In FIG. 3, the grid portions 322 have been sized so that each grid portion is expected to require no more than a selected amount of time to transit by vehicle during any time period (e.g., during any time of day). For example, in FIG. 3 each of the grid portions 322 is expected to be traversed in no more than a minute (e.g., by a motor vehicle). In other embodiments, the portion of the region 310 can be divided based on other considerations. For example, as discussed below with reference to FIGS. 5-7, in certain embodiments the region 310 can be divided into multiple grid portions based on special conditions (e.g., geographic and/or special routing considerations). In still other embodiments, the region 310 can be divided into various grid portions based on multiple/various considerations.

For example, a portion of the region 310 can be divided into grid portions based on an expected transit time, while another part of the region 310 can be divided into grid portions based on special conditions. Although in the illustrated embodiment, the grid portions 322 have rectangular shapes and at least approximately uniform size, in other embodiments the grid portions can have varying shapes and sizes. For example, if the grid portion size is based on expected transit time, a portion of a region having expressways in rural areas would likely have larger grid portions than a portion of the region that includes urban areas because of the higher expected travel speeds on the expressways in the rural areas.

As discussed above, after the region 310 has been divided into grid portions 322, each grid portion 322 that contains an address of interest 316 can be designated as a departure grid, a destination grid, or both. For example, in FIG. 3 grid portions (X1, Y2), (X1, Y3), (X2, Y2), (X2, Y3), (X3, Y4), (X4, Y4), and (X6, Y6) each contain one or more addresses of interest 316. Because the transit time from one grid to another can be direction dependent (e.g., due to various constraints, traffic, and/or geographic conditions), grids can be designated as both destination and departure grids when it is expected that addresses in the respective grid portions will serve as both departure and destination points. In the illustrated embodiment each grid portion 322 that contains an address of interest 316 has been designated as both a departure grid and a destination grid.

Because in the illustrated embodiment, the grid portions are sized so that it takes no more than a minute to transit a grid portion, the time required to travel between addresses of interest in different grids can be represented by the travel time between the corresponding grids. Additionally, because in the illustrated embodiment the grid portions are sized so that it takes no more than a minute to transit a grid portion, travel between addresses within the same grid portion should take no more than a minute. Accordingly, a searchable data arrangement can be generated that includes travel times associated with traveling from selected departure grids to selected destination grids (e.g., via a vehicle). In the illustrated, embodiment, these travel times can be used to predict the travel time that will be required to travel from a selected address of interest in a departure grid to a selected address of interest contained in a destination grid.

Figure 4:
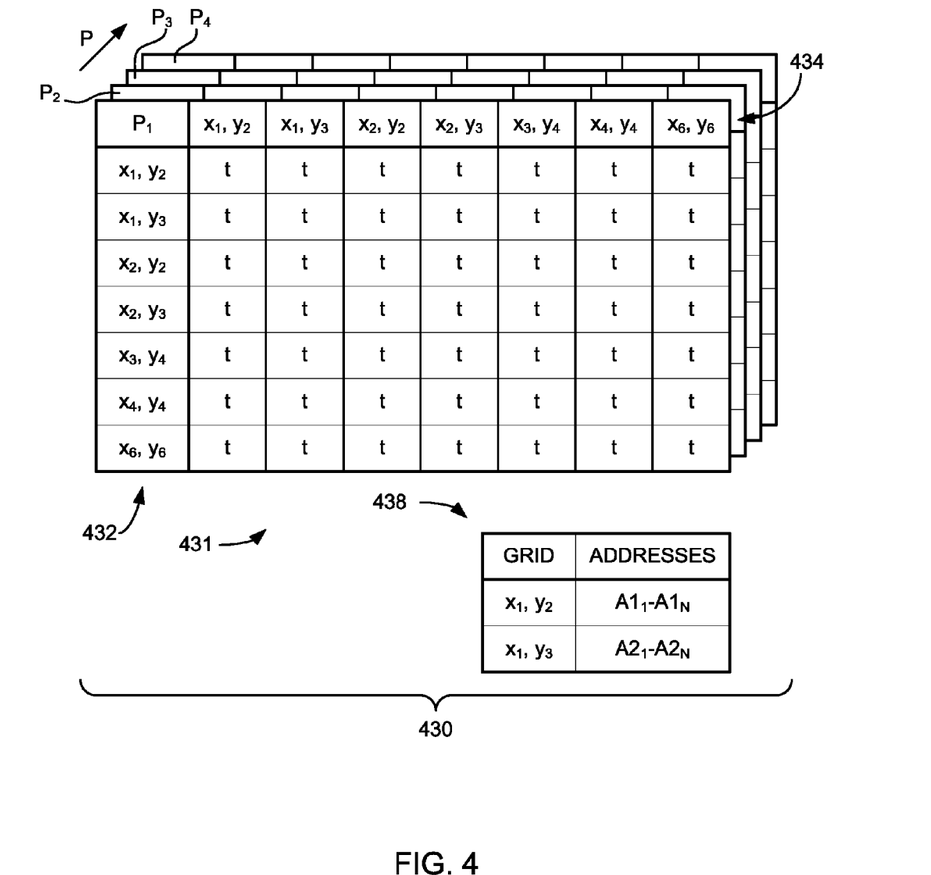
FIG. 4 is a partially schematic illustration of a data arrangement associated with the grid portions shown in FIG. 3.

FIG. 4 is a partially schematic illustration of a data arrangement 430 associated with the grid portions shown in FIG. 3. In FIG. 4, the data arrangement 430 includes a three-dimensional array 431 and a lookup table 438. In other embodiments, the searchable data arrangement 430 can have other configurations. For example, in selected embodiments the data arrangement 430 can include a simple list, a balanced binary tree, an array having more or fewer dimensions, or another type of searchable database/data structure.

In the illustrated embodiment, the three-dimensional array 431 includes departure grids 432 in a first dimension, destination grids 434 in a second dimension, and time periods P in a third dimension. In FIG. 4, the time periods P can include various time periods throughout various days of the week. For example, the time periods can include from Monday through Friday from 5 AM through noon (P1), from noon through 7 PM (P2), and from 7 PM through 5 AM (P3). A fourth time period (P4) can include from 7 PM Friday through 5 AM Monday. In other embodiments, the array can include more, fewer, or different time periods. Additionally, in still other embodiments different departure and destination grid combinations can be associated with different time periods P. For example, in selected embodiments, while one departure/destination grid combination can be associated with the four time periods P referenced above, another departure/destination grid combination can be associated with only one time period P (e.g., a time period that lasts seven days a week, 24 hours a day) or with different multiple time periods P with time ranges spanning different parts of the day.

In the illustrated embodiment, individual cells of the array include travel times t for each corresponding departure grid 432/destination grid 434/period P combinations. For example, the array can be searched to determine a predicted travel time t from a selected departure grid 432 to a selected destination grid 434 during a selected period P by finding the associated cell. Accordingly, in selected embodiments the data arrangement 430 can be searched for the predicted travel time between a first address of interest and a second address of interest by using the lookup table 438.

For example, the illustrated embodiment the lookup table 438 includes a list of each departure and/or destination grids and a list of the one or more addresses of interest associated with each grid (e.g., $A1_1$-$A1_n$, associated with grid (X1,Y2), $A2_1$-$A2_n$, associated with grid (X1,Y3), etc.). Accordingly, in FIG. 4 searching the data arrangement to determine a predicted travel time t from a first address of interest to a second address of interest can include using the lookup table 438 to determine a grid in which the first address is located and selecting that grid as the selected departure grid 432. Searching the data arrangement can further include determining a grid 434 in which the second address of interest is located and selecting that grid as the selected destination grid 434. The three-dimensional array 431 can then be used to determine the travel time associated with the selected departure grid 432 and the selected destination grid 434 during a selected period P. Because in the illustrated embodiment the grid portions have been established so that the maximum time required to transit any grid is expected to be one minute or less, the predicted travel time between the selected departure grid 432 and a selected destination grid 434 can be at least approximately an accurate prediction (e.g., within a few minutes) of the travel time between the first address of interest and the second address of interest.

Various search techniques can be used to accomplish a search for a travel time. For example, in selected embodiments the search can include a manual search of a graphical presentation. In other embodiments, the data arrangement can include a database portion in a computing environment and various computer related searching techniques can be used (e.g., a binary search, other log N search algorithms, or the like).

In selected embodiments, one or more formulas can be used to determine the grid associated with each address and then the three-dimensional array 431 can be used to determine the travel time associated with the selected departure grid 432 and the selected destination grid 434 during a selected period P. For instance, consider a Cartesian Coordinate System ("CCS") of geocode-coordinates each equal to 2 feet in length. If the grids are one mile square and overlaid in Quadrant 1 on the CCS, each mile corresponds to 2,640 geocode-coordinate units. If the origin of the CCS is represented as geocode-coordinates (Xo,Yo) (where Xo=0 and Yo=0), each address can be uniquely identified in the CCS by positive geocode-coordinates (Xa,Ya). A formula can then be used to determine the grid associated with each address (i.e., the grid corresponding to the grid-coordinates calculated for the address).

For example, where each grid is identified by grid-coordinates (Xg,Yg) the following formulas can be used to determine the grid associated with each address: Xg=(Xa−Xo)/2,640 and Yg=(Ya−Yo)/2,640. Accordingly, this formula can be used to determine the departure grid associated with a selected departure address and the destination grid associated with a selected destination address. Once the departure grid and destination grids have been determined, the associated travel time can be determined for a selected period. In other embodiments, other formulas can be used to map addresses to grids and/or formulas can be used for other portions of the travel time determination process.

Once a travel time t is determined from the data arrangement, the travel time t can be adjusted by an operational factor. For example, the travel time can be increased by 80% in response to a sudden snow storm, or increased by 10% for a new or untrained driver operating a vehicle between the addresses. In other embodiments where the data structure does not include separate times for different periods, an operational factor can be used to adjust for travel anticipated to be performed during certain times of day (e.g., rush hour).

In certain cases, the first address of interest and the second address of interest can be located within the same grid portion. In the illustrated embodiment the associated departure grid 432 and the destination grid 434 would be associated with the same grid portion. In selected embodiments, the travel time t from one grid portion to itself can be represented or approximated as the longest time expected to be required to transit the grid portion during a selected period of the day. For example, in the illustrated embodiment the transit time from one grid to itself can be set at one minute because the grid portions have been sized so that it is expected to require no more than a minute to transit the grid portion during any period. Therefore, it can be expected/predicted that it will require less than a minute to travel from a first address of interest located in a grid portion and a second address of interest located in the same grid portion even if the first and second addresses are positioned at opposite ends of the grid portion. In the illustrated embodiment, because the grid portions containing addresses of interest have been designated both departure grids and destination grids, a travel time t associated with traveling from one grid portion (e.g., (X1, Y2)) to itself (e.g., to (X1, Y2)) is contained in a cell associated with the grid portions and a selected period.

In other embodiments, the data arrangement can have other configurations. For example, and other embodiments the data arrangement does not contain travel times for travel between a selected grid portion and its self, and a default value (e.g., one minute) is automatically used or return when a search for a travel time between two addresses in the same grid portion is requested. Although, in the illustrated embodiment only grid portions designated as departure and/or destination grids are represented in the data arrangement, and other embodiments all the grid portions are represented in the data arrangement. In selected embodiments, when all of the grid portions are represented in the data arrangement, those grid portions not containing an address of interest can be designated as inactive so that they can be excluded from a travel time search. In still other embodiments, the data arrangement can be configured so that it provides an associated travel time for departure and destination addresses of interest instead of for departure and destination grids.

Figure 5:
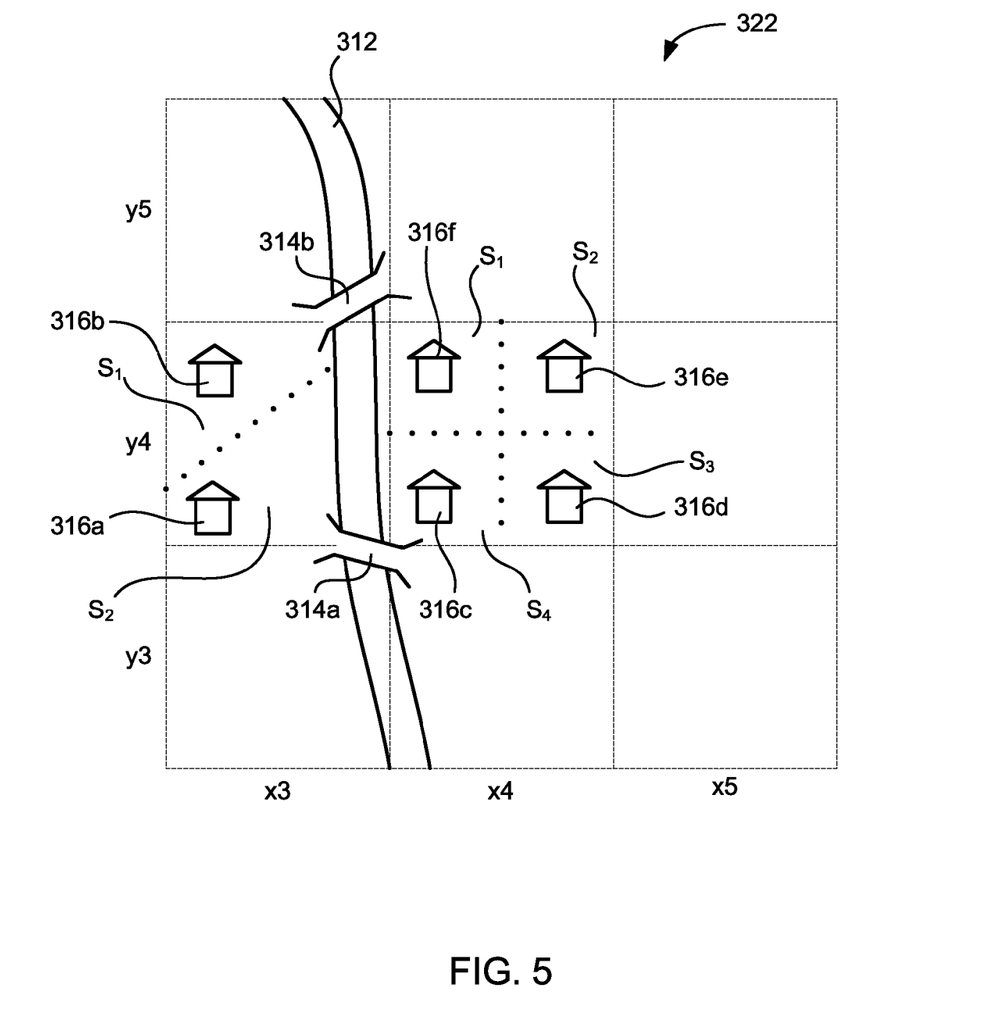
FIG. 5 is a partially schematic illustration of some of the grid portions shown in FIG. 3 that have been modified for special conditions associated with the grid portions in accordance with selected embodiments.

The FIG. 5 is a partially schematic illustration of some of the grid portions 322 shown in FIG. 3 that have been modified for special conditions associated with the grid portions 322 in accordance with selected embodiments. In FIG. 5, two grid portions 322 having addresses of interest are located proximate to the river 312 (grid portions (X3, Y4), (X4, Y4)). The grid portion (X3, Y4) includes a first address of interest 316a and a second address of interest 316b. The grid portion (X4, Y4) includes a third address of interest 316c, a fourth address of interest 316d, a fifth address of interest 316e, and a sixth address of interest 316f. Although in the illustrated embodiment, the two grid portions 322 have been size so that it takes no more than a minute to transit each of the grid portions 322, the travel time between various parts of grid portion (X3, Y4) to various parts grid portion (X4, Y4) can vary greatly because of the requirement to cross the first bridge 314a or the second bridge 314b. Additionally, the water front part of each of the grid portions can include other special conditions (e.g., special routing) that cause variations in travel time between the two grid portions. Accordingly, these grids can be divided into new grids or sub-grids depending on how the data arrangement is structured.

For example, grid portion (X3, Y4) has been divided into two grid portions (shown by dotted lines) having grid addresses of (X3, Y4, S1) and (X3, Y4, S2). Grid portion (X4, Y4) has been divided into four grid portions (shown by dotted lines) having grid addresses of (X4, Y4, S1), (X4, Y4, S2), (X4, Y4, S3), and (X4, Y4, S4). The travel time between the grid portion (X3, Y4, S1) and each of the grid portions (X4, Y4, S1), (X4, Y4, S2), (X4, Y4, S3), and (X4, Y4, S4) can be significantly different than the travel time between the grid portion (X3, Y4, S2) and each of the grid portions (X4, Y4, S1), (X4, Y4, S2), (X4, Y4, S3), and (X4, Y4, S4) based on the bridge that is expected to be used and other waterfront routing considerations.

Figure 6:
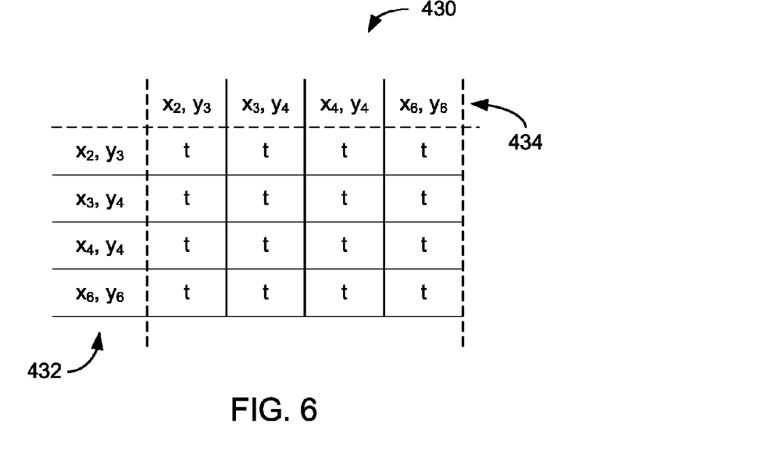
FIG. 6 is a partially schematic illustration of a portion of the data arrangement shown in FIG. 4 before the grid portion modification shown in FIG. 5.
Figure 7:
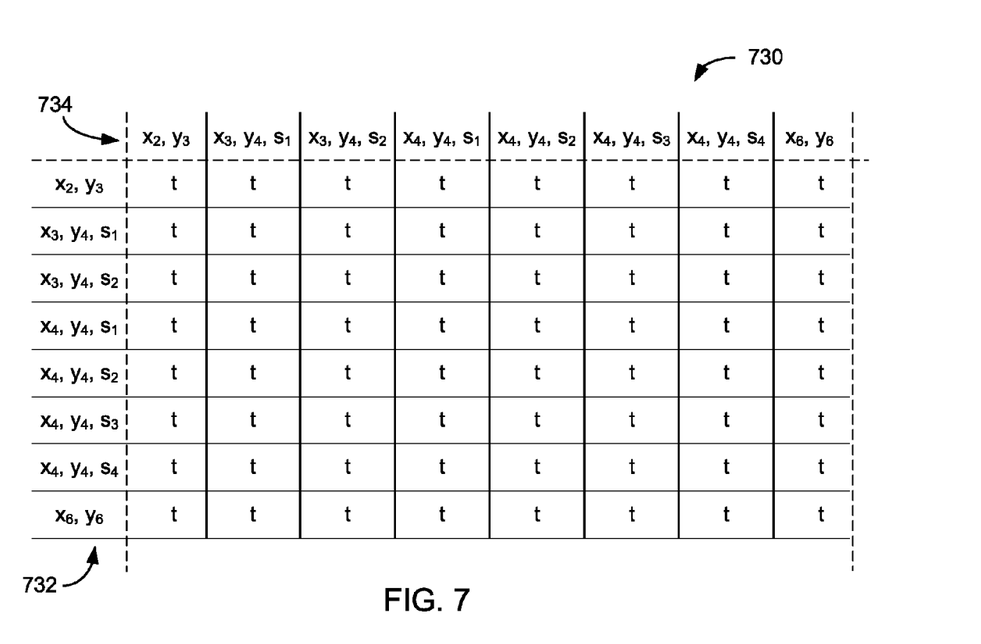
FIG. 7 is a partially schematic illustration of the portion of the data arrangement shown in FIG. 6 after the grid portion modification shown in FIG. 5.

FIG. 6 is a partially schematic illustration of a portion of the data arrangement 430 shown in FIG. 4 before the grid portion modification shown in FIG. 5. FIG. 7 is a partially schematic illustration of the portion of the data arrangement shown in FIG. 6 after the grid portion modification shown in FIG. 5. As shown in FIG. 7, each new grid portion has been designated as a departure grid 732 and destination grid 734 and added to the data arrangement in place of the original grid portions that existed prior to the modification. In the illustrated embodiment, the lookup table 438 (shown in FIG. 4) can also be modified to reflect the modification. As discussed above, in other embodiments the special conditions requiring grid portion modifications can include various types of considerations (e.g., geographic considerations, special routing requirements, limited access areas, and the like).

Figure 8:
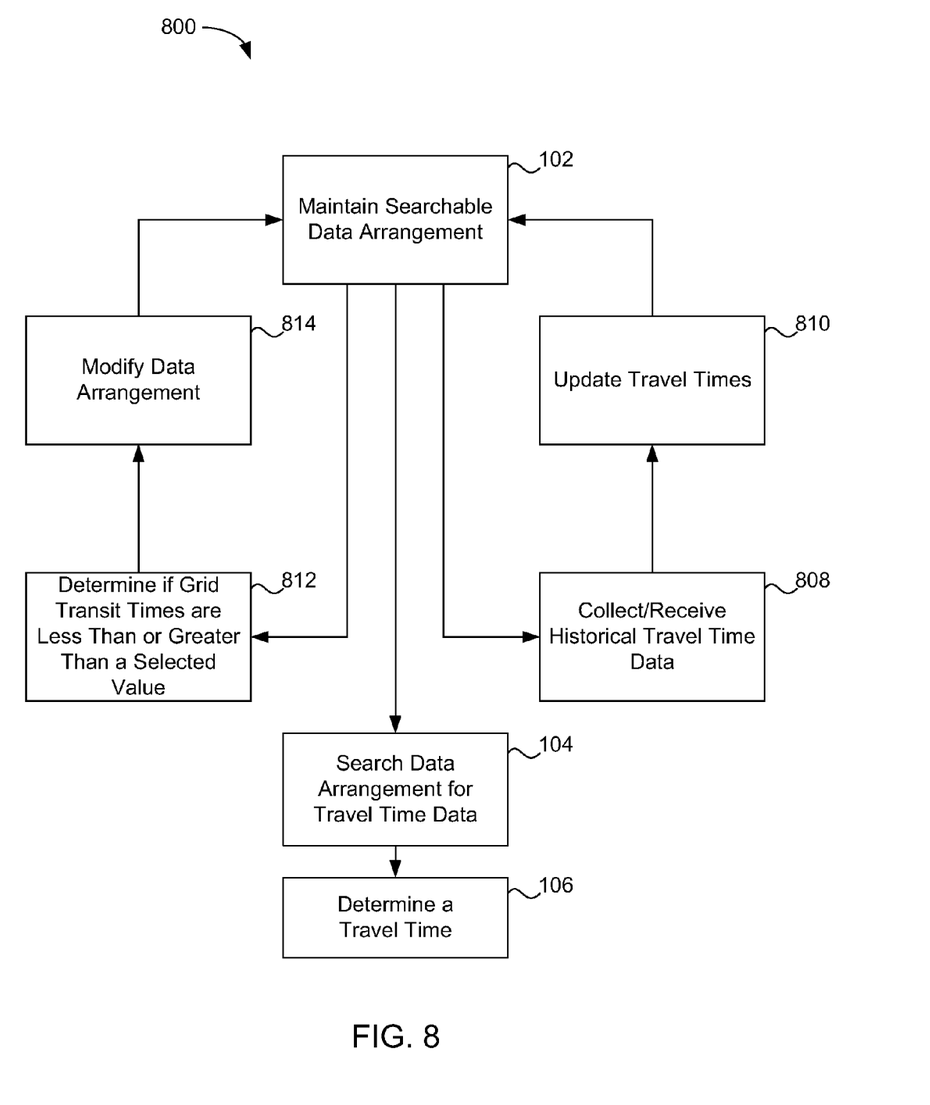
FIG. 8 is a flow diagram that illustrates a process for determining a predicted amount of time to travel from one location to another in accordance with further embodiments.

FIG. 8 is a flow diagram that illustrates a process 800 for determining a predicted amount of time to travel from one location to another location in accordance with further embodiments. In FIG. 8, the process includes maintaining a searchable data arrangement (Block 102), searching the data arrangement for travel time data (Block 104), and determining a travel time (Block 106), as discussed above with reference to FIG. 1. Additionally, in the illustrated embodiment the process 800 includes a learning and/or adaptive portion (e.g., an updating portion) that includes collecting/receiving historical travel time data (Block 808) and updating travel times (Block 810). In FIG. 8, the process 800 also includes determining if grid transit times are less than or greater than a selected value (Block 812), and if so modifying the data arrangement (Block 814) based on the grid transit times.

The travel times (e.g., the initial travel times) in the data arrangement discussed above with reference to FIGS. 4-7 can be determined using various methods, including determining travel times using the distance and assumed speed associated with each segment of a trip, determining travel times using approximations based on experience, determining travel times using assumed speed and an "as the crow flies" distance, determining travel times using rectilinear approximations, determining travel times using a GIS database, determining travel times by traveling the associated routes and recording the time (e.g., conducting calibration trips with supervisory drivers), determining travel times using other travel time generation techniques, and the like. After the initial travel times have been entered into the data arrangement, the data arrangement can be updated based on historical data. For example, as travel is performed from one address of interest to another, the actual amount of time that was required to travel from a selected departure address or departure grid to a select destination address of grid can be collected. Then, various statistical techniques, learning processes, adaptive processes, and/or predictive processes can be used to update the travel times in the data arrangement using the collected historical data.

For example, in selected embodiments a running average of the actual times required to travel from a selected departure grid to a selected destination grid can be used as the travel time in the data arrangement associated with the selected departure/destination grid combination (or selected departure grid/destination grid/period combination). In other embodiments, only the most recent times required to travel from a selected departure grid to a selected destination grid are used as the travel times in the data arrangement. In still other embodiments, other statistical techniques can be used to update the travel times in the data arrangement, including various types of distributions and truncation schemes (e.g., a bell curve distribution). In selected embodiments, by updating the travel times in the data arrangement, accuracy of the travel time estimates obtained from searching the data arrangement can be improved over that of current systems (e.g., the updated travel times in the data arrangement can reflect changes in street network's and/or traffic patterns as they occur over time).

In further embodiments, the collected data can be filtered to exclude data collected under abnormal circumstances from being used to update travel times in the data arrangement. For example, in selected embodiments collected data that is significantly different than that normally collected (e.g., more than three sigma from the mean) are discarded. In other embodiments, collected data is discarded when an unreliable driver (e.g., a new driver) operates a vehicle, when a driver operates a vehicle without passengers, and/or when there is temporary construction associated with various routes.

In still other embodiments, changes or updates to a first travel time from a selected departure grid to a selected destination grid during a selected period can be used to adjust or update one or more second travel times associated with a different departure grid, destination grid, and/or period. For example, in selected embodiments changes to a first travel time can be used to update second travel times proximate to the first travel time in the data arrangement shown in FIG. 4 (e.g., proximate with respect to grid portions and/or periods).

In other embodiments, changes to the first travel times can be used to update second travel times associated with other related characteristics (e.g., related routing portions). In certain embodiments, using the changes in a first travel time to update one or more second travel times can be particularly useful when adding new grid portions and/or when the data arrangement has been initially populated, but has not been updated or only been updated a few times.

Various techniques can be used to determine how much a second travel time should be updated in response to a change in a first travel time, including various statistical techniques and user selections. For example, in certain embodiments an updated or new second travel time can be computed by using the following formula: new second travel time=current second travel time+E*(updated first travel time−old first travel time), where E is a selectable factor used to determine how much the change in the first travel time can influence the second travel time. In the instant example, if E is set to 100% the full update from the first travel time is applied to the second grid. If E is set to 50%, then the change to the first travel time has less influence on the second travel time.

In selected embodiments, second travel times that are closer to the first travel time in the data arrangement and/or that have stronger associations with the first travel time can be influenced more by changes to the first travel time than other second travel times. For example, concentric rings or spheres can define multiple ranges around the first travel time in the data arrangement and second travel times in the outer ranges can be influenced less by changes to the first travel time than second travel times in the ranges that are closer to the first travel time. In certain embodiments, changes to a first travel time are prevented from influencing second travel times under selected conditions. For example, in selected embodiments changes to a first travel time are prevented from influencing second travel times that are associated with a time period that is different from the first travel time. In other embodiments, changes to a first travel time are prevented from influencing second travel times that have been updated recently, that have already been updated a selected number of times, and/or that do not share the same special condition as the first travel time. In still other embodiments, changes in the first travel time are prevented from influencing a second travel time when the change to the first travel time exceeds a certain magnitude (e.g., 1 or 2 minutes).

Figure 9:
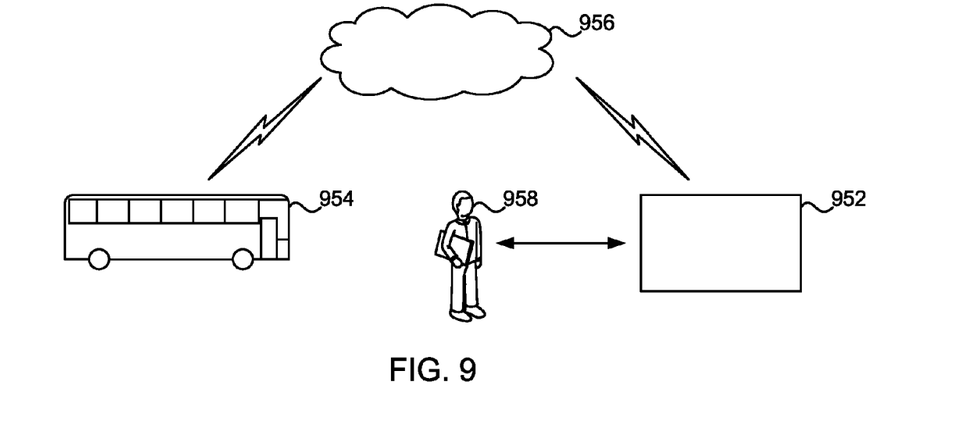
FIG. 9 is a partially schematic illustration of a system for determining actual amounts of time to travel from one location to another in accordance with selected embodiments.

FIG. 9 is a partially schematic illustration of a system 950 for determining or collecting actual amounts of time to travel from one location to another in accordance with selected embodiments. In FIG. 9, a vehicle 954 can travel between various addresses of interest. As discussed above, as the vehicle 954 travels between the various addresses of interest and various grid portions the amounts of time required to travel between selected addresses of interest and selected grid portions can be recorded.

For example, in certain embodiments a vehicle 954 can automatically monitor its location (e.g., GPS) and transmit its location to a computing environment 952 via an interface 956 (e.g., a wireless network). The computing environment 952 can then compute the amount of time required to travel between various locations and use this data to update a data arrangement. In other embodiments, the vehicle 954 can include a computing device that stores the amount of time required to travel between various locations and sends the information to the computing environment 952 via the interface 956 (e.g., via a wireless network and/or a wired connection used to download data at the end of a day). In still other embodiments, an Automatic Vehicle Location/Mobile Data Terminal (AVL/MDT) system can be used to provide the location and time data required to update the travel times in the data arrangement. In yet other embodiments, a driver can fill out a manifest to track the amount of time required to travel between locations and/or a dispatcher can track the amount of time required to travel between locations via radio transmissions and/or in conjunction with an AVL/MDT system. Accordingly, in the illustrated embodiment a system user 958 (e.g., the dispatcher) can exchange information with a computing environment 952 to provide various instructions and/or data to the computing environment 952. Additionally, in FIG. 9 the system user 958 can receive information from the computing environment 952 (e.g., the user 958 can receive travel times resulting from a data arrangement search).

Figure 10:
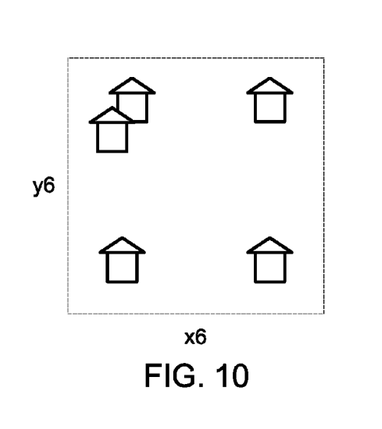
FIG. 10 is a partially schematic illustration of one of the grid portions shown in FIG. 3 that has been monitored for transit times in accordance with certain embodiments.
Figure 11:
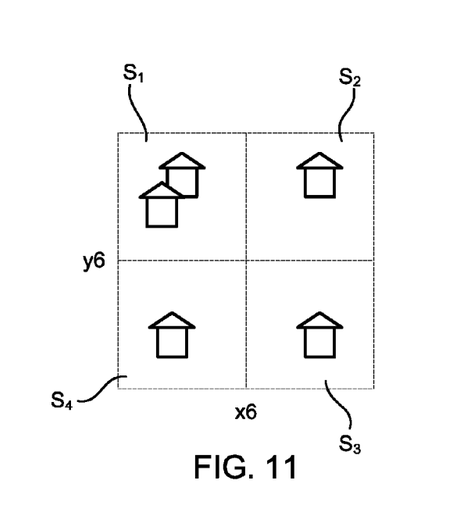
FIG. 11 is a partially schematic illustration of the grid portion shown in FIG. 10 after the grid portion has been divided in response to observed transit times in accordance with selected embodiments.

As discussed above with reference to FIG. 8, the process 800 for determining a predicted amount of time to travel between locations can also include determining if grid transit times in one or more grid portions are less than or greater than a selected value (Block 812), and if so modifying the data arrangement (Block 814) based on the grid transit times. For example, FIG. 10 is a partially schematic illustration of one of the grid portions shown in FIG. 3 that has been monitored for transit times in accordance with certain embodiments. FIG. 11 is a partially schematic illustration of the grid portion shown in FIG. 10 after the grid portion has been divided in response to observed transit times in accordance with selected embodiments.

In the illustrated embodiment, the travel time between various addresses of interest in the grid portion (X6, Y6), shown in FIG. 10, and/or the time required to transit the grid portion has been monitored and it has been determined that transit times within or through the grid portion is greater than a selected amount of time (e.g., greater than one minute). Accordingly, the grid portion has been divided into multiple grid portions or sub-grids, shown in FIG. 11 as new grid portions (X6, Y6, S1), (X6, Y6, S2), (X6, Y6, S3), and (X6, Y6, S4). The data arrangement can be modified to include the new grid portions (e.g., replace the original grid portion (X6, Y6)), similar to the modification discussed above with reference to FIGS. 6 and 7. In selected embodiments, the grid portions can be divided so that each of the new grid portions require at least approximately the same amount of time to traverse (e.g., the same transit time as other grid portions in the data arrangement). In other embodiments, the grid portion can be divided into more or fewer new grid portions and/or in other ways (e.g., when the grid portion includes special conditions). In still other embodiments, grid portions can be divided based on other criteria (e.g., based on user selection, to accomplish other purposes, etc.).

Figure 12:
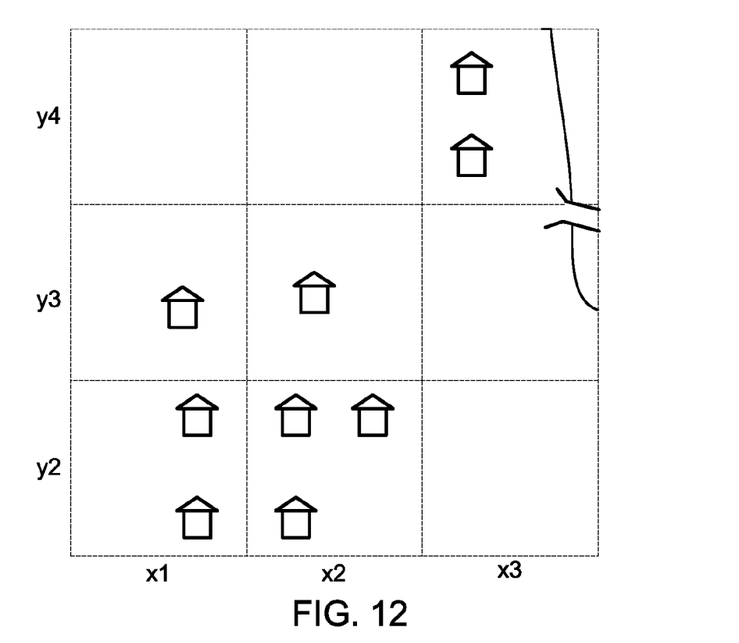
FIG. 12 is a partially schematic illustration of some of the grid portions shown in FIG. 3 that have been monitored for transit times in accordance with other embodiments.
Figure 13:
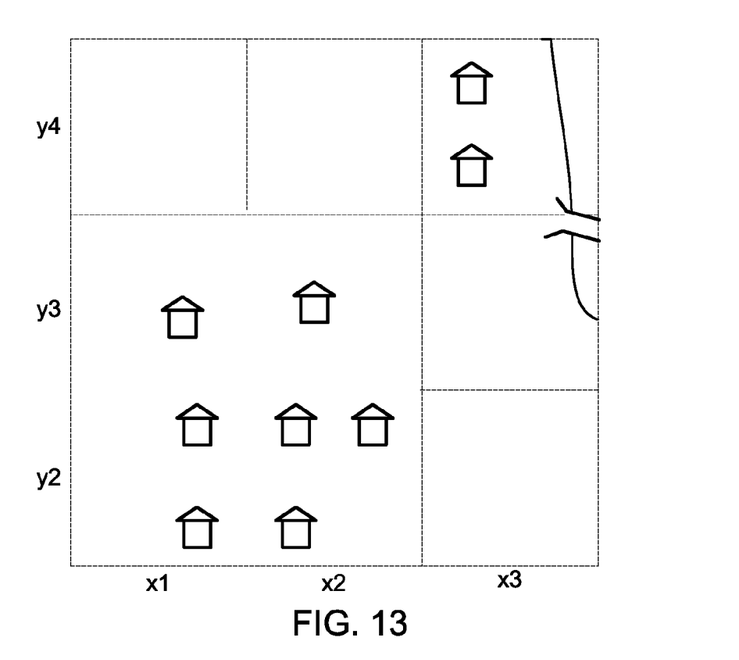
FIG. 13 is a partially schematic illustration of the grid portions shown in FIG. 12 after the grid portions have been combined in response to observed transit times in accordance with selected embodiments.

FIG. 12 is a partially schematic illustration of some of the grid portions shown in FIG. 3 that have been monitored for transit times in accordance with other embodiments. FIG. 13 is a partially schematic illustration of the grid portions shown in FIG. 12 after the grid portions have been combined in response to observed transit times in accordance with selected embodiments. In FIG. 12, the travel time between various addresses of interest in the grid portions (X1, Y2), (X1, Y3), (X2, Y2), and (X2, Y3) and/or the time required to transit the grid portions have been monitored and it has been determined that transit times within or through the grid portions is less than a selected amount of time (e.g., less than one minute). Accordingly, in FIG. 11 the grid portions have been combined into a single new grid. In selected embodiments, the single new grid can be identified as (X1, Y2).

Figure 14:
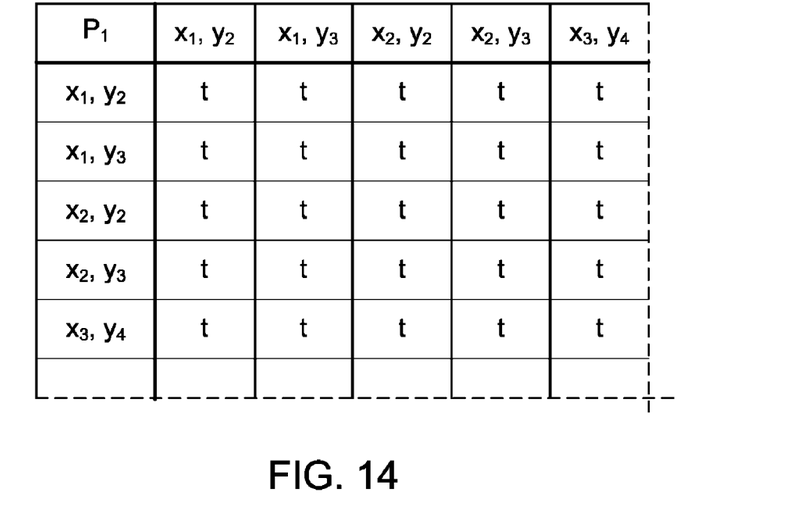
FIG. 14 as a partially schematic illustration of a portion of the data arrangement shown in FIG. 4 prior to the grid portion modification shown in FIG. 13.
Figure 15:
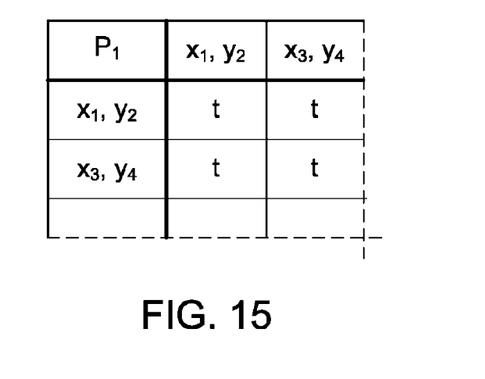
FIG. 15 is a partially schematic illustration of the portion of the data arrangement shown in FIG. 14 after the grid portion modification shown in FIG. 13.

FIG. 14 as a partially schematic illustration of a portion of the data arrangement shown in FIG. 4 prior to the grid portion modification shown in FIG. 13. FIG. 15 is a partial a schematic illustration of the portion of the data arrangement shown in FIG. 14 after the grid portion modification shown in FIG. 13. As shown in FIGS. 14 and 15, the data arrangement shown in FIG. 14 can be modified to replace the departure grids (X1, Y2), (X1, Y3), (X2, Y2), and (X2, Y3), and the destination grids (X1, Y2), (X1, Y3), (X2, Y2), and (X2, Y3) with a new departure grid (X1, Y2) and a new destination grid (X1, Y2), as shown in FIG. 15. By combining grids, in selected embodiments the number of departure/destination grids in the data arrangement can be reduced.

In selected embodiments, the grid portions can be combined so that the new grid portions require approximately the same amount of time to traverse as the other grid portions in the data arrangement (e.g., one minute). In other embodiments, more or fewer grid portions can be combined into a new single grid portion. In still other embodiments, various combinations of grid portions can be combined (e.g., when the grid portions include special conditions). In yet other embodiments, grid portions can be combined based on other criteria (e.g., user selection, to accomplish other purposes, etc.).

In the illustrated embodiment, the grid portions and/or the data arrangement can be updated or modified to include new addresses of interest as the region or region characteristics change (e.g., new buildings are added to an urban area and/or an urban area expands). For example, if a new address of interest is located in an existing grid portion that has been designated as a departure and/or as a destination grid, the lookup table in FIG. 4 can simply be updated to associate the new address with an existing grid portion. If the new address of interest is located in a new grid portion or in a grid portion that has not been designated as a departure and/or destination grid, a new departure and/or destination grid containing the address of interest can be added to the three-dimensional array and the lookup table can be modified appropriately. In still other embodiments, if an address of interest is no longer required the address of interest, the departure grid, and/or the destination grids can be removed from the data arrangement in FIG. 4, as appropriate.

One skilled in the art will recognize that some or all of the processes described above in various embodiments can be implemented on a computing device and/or in a computing environment. The computing device on which the system can be implemented may include a central processing unit, memory, input devices (e.g., keyboard and pointing devices), output devices (e.g., display devices), and storage devices (e.g., disk drives). The memory and storage devices can include computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and so on. The computer systems may include personal digital assistants, cellular/smart phones, personal computers, programmable consumer electronics, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. Additionally, in selected embodiments the functionality of various embodiments above can be combined with and/or integrated into other computer implemented process (e.g., Adept or Symetrix).

Although many of the embodiments above have been described in the context of a motor vehicle traveling in a region that includes a land surface area, other embodiments can include other types of vehicles and/or other types of regions. For example, in other embodiments various processes described above can be applied to travel using other types of vehicles, including bicycles, boats, and aerospace vehicles and the region can include land regions, water regions, atmospheric regions, and/or space regions. In still other embodiments, various processes described above can be applied to non-vehicular travel, including foot traffic.

A feature of some of the embodiments discussed above is that a system can provide travel time estimations that are more accurate than with current systems. Additionally, the system can update the travel times based on historical data and modify the data arrangement based on grid transit times. An advantage of this feature is that more accurate estimates can provide better efficiencies in operation and vehicle utilization.

From the foregoing, it will be appreciated that specific embodiments of the invention have been described herein for purposes of illustration, but that various modifications may be made without deviating from the invention. Additionally, aspects of the invention described in the context of particular embodiments may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

I claim:

1. A computer-readable non-transitory medium containing instructions for controlling a computing environment to perform a method comprising:

maintaining a searchable data arrangement including travel times associated with traveling from selected departure grids to selected destination grids, each selected departure grid and each selected destination grid being associated with at least one address of interest in a region, the searchable data arrangement being a grid-by-grid look-up table, where links are implied by indexing;

receiving historical data that includes actual amounts of time that have been required to travel from selected departure grids to selected destination grids;

updating the travel times using the historical data;

receiving a command to search the data arrangement to determine a predicted travel time from a first address of interest to a second address of interest;

determining a selected departure grid in which the first address is located;

determining a selected destination grid in which the second address of interest is located; and determining the travel time associated with the selected departure grid and the selected destination grid.

2. The computer-readable medium of claim 1, wherein the method further comprises:
   determining if transit times within or through one or more of the departure grids and destination grids is less than or greater than a selected amount of time, and if so
   combining the one or more of the monitored grids into a single new grid, dividing the one or more of the monitored grids into multiple new grids, or both.

3. A method for determining a predicted amount of time required to travel from one location to another, the method using at least one electronic processor and comprising:
   dividing a region into multiple grid portions;
   designating each grid portion that contains at least one address of interest as a departure grid, a destination grid, or both;
   generating a searchable data arrangement that includes travel times associated with traveling from selected departure grids to selected destination grids;
   updating the travel times using historical data, wherein dividing a region into multiple grid portions includes (a) dividing a portion of the region into multiple grid portions that are expected to require no more than a selected amount of time to transit, (b) dividing a portion of the region into multiple grid portions based on certain conditions, or (c) both (a) and (b);
   receiving a command to search the data arrangement to determine a predicted travel time from a first address of interest to a second address of interest;
   determining a selected departure grid in which the first address is located;
   determining a selected destination grid in which the second address of interest is located; and
   determining the travel time associated with the selected departure grid and the selected destination grid.

4. The method of claim 3 wherein generating a searchable data arrangement includes generating a searchable three-dimensional data arrangement that includes travel times associated with traveling from selected departure grids to selected destination grids during selected time periods.

5. The method of claim 3 wherein updating the travel times with historical data includes updating the travel times with actual amounts of time that have been required to travel from selected departure grids to selected destination grids.

6. The method of claim 3 wherein updating the travel times using historical data includes:
   collecting data that includes actual amounts of time that have been required to travel from selected departure grids to selected destination grids;
   filtering the collected data to exclude data collected under abnormal circumstances; and
   updating the travel times using the filtered data.

7. The computer readable medium of claim 1 wherein the method further comprises dividing the region into multiple grid portions including (a) dividing a portion of the region into multiple grid portions that are expected to require no more than a selected amount of time to transit, (b) dividing a portion of the region into multiple grid portions based on certain conditions, or (c) both (a) and (b).

8. The method of claim 3 wherein generating a searchable data arrangement includes generating a searchable three-dimensional data arrangement that includes travel times associated with traveling from departure grids to destination grids during different time periods, and wherein searching the data arrangement comprises:
   determining the travel time associated with the selected departure grid, the selected destination grid, and the selected time period during a selected time period.

9. The method of claim 3,
   wherein determining the travel time associated with the selected departure grid and the selected destination grid includes adjusting the travel time by an operational factor.

10. The method of claim 3, further comprising:
    determining if transit times within or through one or more of the departure grids and destination grids is less than or greater than a selected amount of time, and if so combining the one or more of the monitored grids into a single new grid, dividing the one or more of the monitored grids into multiple new grids, or both.

11. The method of claim 3 wherein updating the travel times includes updating the travel times using at least one of a statistical technique, a learning process, an adaptive process, and/or a predictive process.

12. The method of claim 3, further comprising searching the data arrangement to determine a first predicted travel time from a the first address of interest to a the second address of interest during a selected time period, wherein the first predicted travel time is different than a second predicted travel time, the second predicted travel time being associated in the data arrangement with travel from the second address of interest to the first address of interest during the selected time period.

13. The method of claim 3 wherein updating the travel times with historical data includes updating the travel times with an actual amount of time that has been required to travel from at least one first address in a selected departure grid to at least one second address in a selected destination grid.

* * * * *